(12) United States Patent
Genderjahn et al.

(10) Patent No.: US 10,215,254 B2
(45) Date of Patent: Feb. 26, 2019

(54) HYDRAULIC BEARING AND MOTOR VEHICLE COMPRISING A HYDRAULIC BEARING OF THIS TYPE

(71) Applicant: ContiTech Vibration Control GmbH, Hannover (DE)

(72) Inventors: Robert Genderjahn, Hannover (DE); Bernhard Uhrmeister, Hannover (DE); Peter Marienfeld, Marklohe (DE)

(73) Assignee: ContiTech Vibration Control GmbH, Hannover (DE)

( * ) Notice: Subject to any disclaimer, the term of this patent is extended or adjusted under 35 U.S.C. 154(b) by 124 days.

(21) Appl. No.: 15/318,149

(22) PCT Filed: Apr. 8, 2015

(86) PCT No.: PCT/EP2015/057548
§ 371 (c)(1),
(2) Date: Dec. 12, 2016

(87) PCT Pub. No.: WO2015/197214
PCT Pub. Date: Dec. 30, 2015

(65) Prior Publication Data
US 2017/0130800 A1    May 11, 2017

(30) Foreign Application Priority Data
Jun. 23, 2014 (DE) .................. 10 2014 211 953

(51) Int. Cl.
*F16F 13/26* (2006.01)
*B60K 5/12* (2006.01)
(Continued)

(52) U.S. Cl.
CPC .......... *F16F 13/262* (2013.01); *B60K 5/1208* (2013.01); *B62D 63/04* (2013.01);
(Continued)

(58) Field of Classification Search
CPC .......... F16F 13/04; F16F 13/08; F16F 13/085; F16F 13/10; F16F 13/18; F16F 13/26;
(Continued)

(56) References Cited

U.S. PATENT DOCUMENTS 4,877,225 A    10/1989    Noguchi et al.
5,209,460 A    5/1993    Bouhours et al.
(Continued)

FOREIGN PATENT DOCUMENTS

DE    102005044233 A1    3/2007
DE    102012008497 A1    10/2013
(Continued)

*Primary Examiner* — Robert A. Siconolfi
*Assistant Examiner* — San M Aung
(74) *Attorney, Agent, or Firm* — David L. Cate (57) ABSTRACT

The invention relates to a hydraulic bearing (2) comprising a bearing spring (36), a working chamber (4) that is at least partially surrounded by the bearing spring (36) and that is filled with a hydraulic fluid, a first compensation chamber (6) and a first restrictor channel (10) for exchanging hydraulic fluid, said channel being formed between the working chamber (4) and the first compensation chamber (6). The hydraulic bearing (2) has a controllable valve (34) for shutting-off or restricting the flow of hydraulic fluid through the first restrictor channel (10). The invention also relates to a motor vehicle comprising a hydraulic bearing (2) of this type.

16 Claims, 2 Drawing Sheets

(51) Int. Cl.
*F16F 13/08* (2006.01)
*F16F 13/10* (2006.01)
*B62D 63/04* (2006.01)

(52) U.S. Cl.
CPC ............ *F16F 13/085* (2013.01); *F16F 13/10* (2013.01); *F16F 13/264* (2013.01)

(58) Field of Classification Search
CPC ........ F16F 13/30; F16F 13/105; F16F 13/262; F16F 13/264
USPC .................. 267/140.13, 140.14, 140.15, 219
See application file for complete search history.

(56) References Cited

U.S. PATENT DOCUMENTS

| | | | | |
|---|---|---|---|---|
| 5,297,781 | A * | 3/1994 | Gennesseaux | F16F 13/264 267/140.14 |
| 5,439,204 | A * | 8/1995 | Yamazoe | F16F 13/264 267/140.14 |
| 5,653,427 | A * | 8/1997 | Matsuda | F16F 13/10 267/140.14 |
| 5,961,104 | A * | 10/1999 | Gennesseaux | H01F 7/1638 267/140.14 |
| 6,073,918 | A | 6/2000 | Kojima et al. | |
| 6,476,702 | B1 | 11/2002 | Hartwig et al. | |
| 2001/0010413 | A1 * | 8/2001 | Takashima | F16F 13/26 267/140.13 |
| 2005/0017420 | A1 | 1/2005 | Nemotoi et al. | |
| 2005/0051936 | A1 | 3/2005 | Gries et al. | |
| 2005/0218570 | A1 * | 10/2005 | Ueki | F16F 13/107 267/140.11 |
| 2005/0236750 | A1 | 10/2005 | Freudenberg | |
| 2007/0085249 | A1 | 4/2007 | Happou et al. | |
| 2007/0216074 | A1 | 9/2007 | Loheide et al. | |
| 2008/0174058 | A1 | 7/2008 | Saiki et al. | |
| 2010/0219570 | A1 * | 9/2010 | Kojima | F16F 13/264 267/140.13 |
| 2011/0042872 | A1 * | 2/2011 | Hasegawa | F16F 13/26 267/140.14 |
| 2011/0042873 | A1 * | 2/2011 | Yamamoto | F16F 13/262 267/140.14 |
| 2013/0256960 | A1 | 10/2013 | Marienfeld et al. | |
| 2016/0138671 | A1 * | 5/2016 | Kim | F16F 13/22 267/140.14 |

FOREIGN PATENT DOCUMENTS

| | | |
|---|---|---|
| DE | 102005028337 B4 | 3/2014 |
| DE | 102006035509 B4 | 9/2014 |
| EP | 0529133 A1 | 3/1993 |
| JP | 2004150546 A | 5/2004 |
| JP | 2010276168 A | 12/2010 |

* cited by examiner

HYDRAULIC BEARING AND MOTOR VEHICLE COMPRISING A HYDRAULIC BEARING OF THIS TYPE

The invention relates to a hydraulic mount, having a load-bearing spring, a working chamber which is at least partially surrounded by the load-bearing spring and which is filled with a hydraulic fluid, a first equalization chamber, and a first throttle duct which is formed between the working chamber and the first equalization chamber and which serves for the exchange of hydraulic fluid.

The invention also relates to a motor vehicle which comprises a vehicle frame, an engine and an engine mount in the form of a hydraulic mount, which engine mount produces a connection, with mounting action, between the engine and the vehicle frame.

Hydraulic mounts, also referred to as hydraulic bearings, are known from the prior art. They serve for the elastic support of assemblies, in particular of motor vehicle engines. By way of such hydraulic mounts situated for example between an engine and a chassis of the motor vehicle, it is firstly sought to prevent engine vibrations from being transmitted to the chassis, and secondly, it is sought to achieve that the vibrations of the chassis that arise during driving operation cannot pass, or can pass only having been damped, from the chassis to the engine.

Here, consideration must be given to the known conflict in the field of vibration isolation which consists in the fact that the mount should firstly be as rigid as possible in order to be able to accommodate high loads or mount forces, and secondly must have a soft characteristic in order to isolate to the greatest possible extent vibrations that arise over a broad frequency range.

In their basic version, such hydraulic bearings normally have a rubber element as a load-bearing spring, also referred to as a load-bearing body, in conjunction with a hydraulic damper. The rubber element is often in the form of a hollow cone. The load-bearing spring can thus form a casing wall of the working chamber. On the upper, pointed end side of the hollow cone, there is normally provided an upper cover to which there is attached a connection element for the fastening of the engine. The connection element is normally a threaded bolt which can be screwed to the engine. Here, the hydraulic damper normally comprises at least two chambers, specifically the stated working chamber and an equalization chamber. In the longitudinal direction of the hydraulic mount, the equalization chamber is normally arranged below the working chamber. To separate the working chamber and the equalization chamber from one another, a partition may be arranged between the equalization chamber and the working chamber. Furthermore, a throttle duct which is formed between the working chamber and the equalization chamber is provided for the exchange of hydraulic fluid. The throttle duct is preferably formed at least in sections by the partition. Alternatively, the throttle duct may also be formed separately from the partition. The hydraulic fluid in the working chamber, the equalization chamber and the throttle duct preferably forms the entire hydraulic volume of the hydraulic mount, unless further additional volumes are provided in special embodiments. As hydraulic fluid, use is preferably made of a mixture of oil and water or a fluid with glycol.

When the hydraulic mount is subjected to load, a force acts on the load-bearing spring in a longitudinal direction of the hydraulic mount, such that said load-bearing spring elastically deforms. Said deformation is also referred to as compression of the load-bearing spring. The working chamber is at least partially surrounded by the load-bearing spring, such that the working chamber is reduced in size as a result of the compression of the load-bearing spring. Thus, the pressure in the working chamber increases, whereupon a part of the hydraulic fluid of the working chamber flows through the throttle duct into the equalization chamber. The throttle duct constitutes a flow resistance for the flowing hydraulic fluid. The flow through the correspondingly formed throttle duct thus generates dissipation and therefore damping work.

The equalization chamber is preferably equipped with at least one wall part which is deformable in the manner of a diaphragm, in particular a rolling diaphragm, such that the part of the hydraulic fluid which flows into the equalization chamber can be accommodated.

A hydraulic mount of said type is known for example from the document DE 10 2010 060 886 A1 or from the document DE 10 2012 008 497 A1.

The damping characteristics of such hydraulic mounts are frequency-dependent owing to their type of construction. Static or quasi-static loads below a frequency of 5 Hz are in this case normally accommodated by the load-bearing spring, which exhibits relatively high stiffness.

Low-frequency vibrations, that is to say vibrations with frequencies of approximately 5 to 20 Hz, which generally occur with large amplitudes, are damped by way of the interaction of the two hydraulic chambers via the throttle duct. Here, the damping arises with the flow of at least a part of the hydraulic fluid of the working chamber through the throttle duct into the equalization chamber and vice versa, with corresponding damping work being performed.

High-frequency vibrations, that is to say vibrations in the frequency range from 20 Hz to for example 50 Hz, 100 Hz or 200 Hz, are transmitted with very little damping, or virtually without damping, owing to the inertia, viscosity and incompressibility of the hydraulic fluid and/or the high stiffness and inertia of the load-bearing spring. Although said vibrations generally only occur with small amplitudes, they are of relatively high importance owing to their acoustic action.

For better isolation of such vibrations, the partition between working chamber and equalization chamber may be formed so as to be partially flexible or with a free travel. Such a solution however does not satisfy many isolation requirements, in particular with regard to the ever-increasing demands for comfort in motor vehicles. This is because increased flexibility of the partition reduces the dynamic stiffness of the hydraulic mount even at low frequencies. This can result in reduced damping. A so-called damping loss is also spoken of.

The invention is therefore based on the object of providing a hydraulic mount in the case of which the stated disadvantages are eliminated or reduced. The hydraulic mount should preferably be designed to offer the best possible damping for quasi-static loads and in the low-frequency vibration range and to offer the best possible isolation in the relatively high-frequency vibration range.

According to a first aspect, the object is achieved by way of the hydraulic mount according to the invention, having a load-bearing spring, a working chamber which is at least partially surrounded by the load-bearing spring and which is filled with a hydraulic fluid, a first equalization chamber, and a first throttle duct which is formed between the working chamber and the first equalization chamber and which serves for the exchange of hydraulic fluid, wherein the hydraulic mount has a controllable valve for shutting off or throttling a throughflow of hydraulic fluid through the first throttle duct.

Here, the invention is based on the concept of reducing the dynamic stiffness of the hydraulic mount for the high-frequency vibration range in order to realize the best possible isolation characteristics. One possibility for reducing said dynamic stiffness consists in reducing the stiffness of the wall that delimits the equalization chamber. In other words, this means designing the equalization chamber so as to exhibit greater flexibility. A hydraulic mount of said type would therefore exhibit better isolation action for high-frequency vibrations. To nevertheless prevent an associated loss of damping in the presence of quasi-static loads, the hydraulic mount according to the invention has a controllable valve for shutting off or throttling a throughflow of hydraulic fluid through the first throttle duct. Thus, the valve can be shut off in the presence of a quasi-static load. The stiffness of the hydraulic mount then at least substantially corresponds to the stiffness of the load-bearing spring. The hydraulic mount thus has the desired stiffness in the presence of quasi-static loads. If the vibrations acting on hydraulic mount exceed a certain frequency, the valve can be opened again, such that a corresponding isolation action is realized. In a particularly simple case, the valve can be switched in controlled fashion from an opened state to a closed state or vice versa. A valve is therefore preferably to be understood to mean a controllable means for closing or opening a duct. A valve may thus also be designed as a slide or the like. Provision may alternatively be made for the valve to be designed to throttle a throughflow of hydraulic fluid. The valve may thus be designed as a throttle or throttle valve. It is thus possible for the valve to assume any state of opening between a fully opened state and the closed state. Depending on the vibrations acting on the hydraulic mount, it is thus possible, by way of the controllable valve, for the throughflow through the first throttle duct to be adjusted such that the best possible damping or isolation of the vibrations, respectively, is realized. For the corresponding adjustment of the valve, the valve is controllable. For this purpose, an actuator may be provided for the hydraulic mount, which actuator actuates the valve.

The embodiment according to the invention of the hydraulic mount thus offers the possibility of designing the equalization chamber to be as flexible as possible, without this having an adverse effect on the damping and the dynamic stiffness of the hydraulic mount in the presence of a quasi-static load or in the presence of low-frequency vibrations acting on the hydraulic mount.

A preferred embodiment of the hydraulic mount is distinguished by a second equalization chamber and by a second throttle duct which is formed between the working chamber and the second equalization chamber and which serves for the exchange of hydraulic fluid. Thus, at least two equalization chambers and two throttle ducts are provided for the hydraulic mount. In the presence of static or quasi-static loads, the controllable valve can close off the first throttle duct. Said static or quasi-static loads are thus at least substantially accommodated by the load-bearing spring. The valve can remain closed even in the presence of low-frequency vibrations. This is because the low-frequency vibrations can be damped by way of an interaction of the working chamber and of the second equalization chamber via the second throttle duct. As discussed in the introduction, it is specifically the case that damping work is performed as a result of the flow of the hydraulic fluid through the second throttle duct. If relatively high-frequency vibrations occur, the valve can be opened such that the dynamic stiffness of the hydraulic mount is reduced and the isolation characteristics of the hydraulic mount are improved.

A preferred embodiment of the hydraulic mount is characterized by a partition which is arranged between the working chamber and the second equalization chamber, wherein the second throttle duct is formed by the partition. The second throttle duct is thus preferably a passive throttle duct. This is because the second throttle duct, as a result of the fact that it is formed by the partition, can be free from active elements such as for example the controllable valve. Such an embodiment of the hydraulic mount is particularly compact and easy to produce.

A preferred embodiment of the hydraulic mount is characterized in that the hydraulic mount comprises a control diaphragm, which is designed for the variation of a working chamber volume of the working chamber, and an actuator for the deflection of the control diaphragm, wherein the valve is controllable by way of the actuator. Such an actuator can also be referred to as an actuating means. Actuators which have in each case one stator and one armature have proven to be particularly expedient. Here, the armature is formed so as to be mounted movably with respect to the stator, such that the armature can be deflected relative to the stator in a longitudinal direction of the actuator. The armature is mechanically connected to a control diaphragm which is preferably assigned to the partition. The control diaphragm may in this case be formed by a flexible part of the partition. It is however also possible for the control diaphragm to be enclosed by the partition and to thus be regarded as a constituent part of the partition. The control diaphragm can be elastically deformed in its normal direction. By virtue of the armature being mechanically coupled to the control diaphragm, it is possible by way of the actuator for the control diaphragm to be deformed in controlled fashion in its normal direction. Here, it may be provided that the armature is not connected directly to the controlled diaphragm, it rather being the case that a joint mechanism, for example, is provided which is arranged between the armature and the control diaphragm in order to transmit movements and/or forces from the armature to the control diaphragm. With the deformation of the control diaphragm in its normal direction, the hydraulic volume of the working chamber changes. This is the case in particular if the control diaphragm forms a part of the partition with respect to the working chamber. The actuator thus also serves for controlling the hydraulic volume of the working chamber.

If the hydraulic mount is used for the mounting of an engine of a motor vehicle, sensors of the motor vehicle may be used in order to transmit the vibrations emitted by the engine to an as far as possible only highly damped extent to an interior compartment, or to even completely decouple the vibrations of the engine from the chassis. For this purpose, it is for example possible for a sensor to be provided which can measure vibrations of the engine or of the chassis. Alternatively, it is also possible for multiple sensors to be provided at various locations of the engine and/or of the chassis.

If high-frequency vibrations are detected by the sensor for measuring the vibrations of the chassis, the control diaphragm can be deflected synchronously by the actuator. Here, the direction of the deflection may be defined by the type of construction of the partition or of the control diaphragm. The vibrations of the engine give rise to corresponding high-frequency pressure fluctuations in the hydraulic fluid of the working chamber. With the synchronous deflection of the control diaphragm, said high-frequency pressure fluctuations are as far as possible completely balanced. In the best case, compensation is thus realized, such that said high-frequency vibrations are not transmitted by the hydraulic mount. Correspondingly high-frequency vibrations thus do not give rise to vibration or noise emissions, or give rise to only very low vibration or noise emissions, in the interior compartment of the motor vehicle. By way of the discussed actuation of the actuator and of the corresponding action on the control diaphragm, it is thus sought to realize a lowering of the dynamic spring rate in the range of the high-frequency vibrations. In other words, it is sought to switch the hydraulic mount into a "soft" state for high-frequency vibrations.

If low-frequency vibrations with large amplitudes are detected by the sensor for measuring the vibrations of the chassis, it has been found in practice that the control diaphragm can have only a very small influence on the damping of such vibrations. Therefore, in an advantageous embodiment of the invention, provision is made for the actuators to be used for a further function, specifically for the control of the valve. The actuator thus serves both for the actuation of the valve and for the deflection of the control diaphragm. From experience, only short travels are required for the deflection of the control diaphragm, such that, in the case of high-frequency vibrations of the actuator, a procedure is followed in which the valve remains in an open state and at the same time the control diaphragm is caused to deflect. In the presence of a quasi-static load of the hydraulic mount or if low-frequency vibrations occur, it is not necessary for the control diaphragm to be actuated in accordance with the occurring vibrations. The actuator can thus actuate the valve such that the valve is closed or is in a defined throttling state.

A preferred embodiment of the hydraulic mount is characterized in that the hydraulic mount has a control duct which leads from the working chamber to the control diaphragm. The integration of the control diaphragm into the hydraulic mount is facilitated by way of the control duct. This is because the control diaphragm can now be arranged at a space within the hydraulic mount that is expedient for the overall construction of the hydraulic mount. It is thus possible, for example, for the control diaphragm to be arranged laterally with respect to the equalization chamber or below the equalization chamber. Other alternatives are basically also conceivable.

A preferred embodiment of the hydraulic mount is characterized in that the control duct forms a section of the first throttle duct. By virtue of the fact that the control duct forms a section of the first throttle duct, the hydraulic mount can be made more compact. Furthermore, weight can be saved because, for the common section, no additional material has to be used for forming a corresponding duct wall.

A preferred embodiment of the hydraulic mount is characterized in that the valve is formed by the control diaphragm and the partition. It is thus possible, for example, for the partition to form a valve seat and the control diaphragm to form a valve disk which can be moved against the valve seat in order to close the valve. In this case, the partition would likewise form a section of the first throttle duct. This would have the advantage that no additional material would have to be used to form the corresponding section. The hydraulic mount would therefore be particularly compact and lightweight. Owing to the dual function of the control diaphragm, it would likewise be possible for weight and structural space to be saved. Since the control diaphragm can be deflected by way of the actuator, it would be possible to use the same actuator to close or open the valve as described above. The deflection of the control diaphragm would then be possible when the valve is in the open state. The control diaphragm, the partition and the actuator would therefore have in each case at least one dual function with a corresponding synergistic effect.

A preferred embodiment of the hydraulic mount is characterized in that the partition forms a sealing surface of the valve and the control diaphragm forms a counterpart sealing surface of the valve, wherein a space between the sealing surface and the counterpart sealing surface forms a section of the first throttle duct. By virtue of the actuator being designed to deflect and/or to move the control diaphragm, the counterpart sealing surface can be pressed against the sealing surface formed by the partition, such that a corresponding seal is formed. In this case, the valve would close the first throttle duct. If the counterpart sealing surface is separated from the sealing surface by way of the actuator, the valve opens again. The space between the sealing surface and the counterpart sealing surface thus permits a through-flow of hydraulic fluid again, such that the corresponding space forms a section of the throttle duct. In this case, too, it is the case that the control diaphragm and the partition can in each case perform multiple functions, such that a compact and lightweight construction of the hydraulic mount can be realized.

A preferred embodiment of the hydraulic mount is characterized in that the partition has, on a side facing toward the control diaphragm, a sealing contour which forms the sealing surface, and the control diaphragm has, on a side facing toward the partition, a further sealing contour which forms the counterpart sealing surface. With the two sealing contours, it is possible for a throttle valve to be produced particularly easily. This is because the contours may for example be of in each case convex and/or concave form in cross section, such that the two contours for example fit together. It is thus possible for the corresponding flow resistance of the valve to be adjustable in particularly easily controlled fashion.

A preferred embodiment of the hydraulic mount is characterized in that the actuator comprises a stator and an armature which is movable in a longitudinal direction of the stator, the armature is assigned an armature plunger, the armature is mechanically connected by way of the armature plunger to the control diaphragm, the hydraulic mount comprises a first rolling diaphragm, the first rolling diaphragm is fastened to the armature plunger and to the partition, and the first equalization chamber is formed between the partition, the armature plunger and the first rolling diaphragm.

With regard to a basic mode of operation of an actuator, reference is made to the explanations above and to the document DE 198 39 464 C2. The actuator is in particular an electromagnetic linear actuator and preferably a reluctance linear actuator. It would however basically also be possible for other actuators, in particular other electric actuators, to be used.

The armature plunger assigned to the armature may be connected fixedly or articulatedly to the rest of the armature. The armature plunger may thus be formed for example in the manner of a connecting rod. This makes it possible for the first equalization chamber to form radially at the outside with respect to the armature plunger. For this purpose, it is provided that the hydraulic mount comprises a first rolling diaphragm. The first rolling diaphragm is preferably composed of elastic material. The first rolling diaphragm may furthermore be of ring-shaped form. In the latter embodiment, the first rolling diaphragm is fastened to the armature plunger and to the partition. For this purpose, a radially inside edge of the ring-shaped, first rolling diaphragm may be fastened to the armature plunger, and a radially outside edge of the ring-shaped, first rolling diaphragm may be fastened to the partition, in non-positively locking, positively locking and/or cohesive fashion. The first equalization chamber then forms between the partition, the armature plunger and the first rolling diaphragm. By virtue of the fact that the partition and the armature plunger form a part of the wall of the first equalization chamber, the hydraulic mount is of particularly compact form.

A preferred embodiment of the hydraulic mount is characterized in that the partition has a bore through which the armature plunger extends, wherein a space between the armature plunger and a radially inside wall of the bore forms a section of the first throttle duct. By virtue of the fact that the armature plunger leads through the bore of the partition, it is possible for the control diaphragm and the stator of the actuator to be arranged on different sides of the partition. It is thus possible for the structural space of the hydraulic mount to be optimally utilized. The control diaphragm may, for this purpose, be arranged on that side of the partition which faces toward the working chamber, such that the control diaphragm can vary the working chamber volume of the working chamber directly or via the control duct. The first equalization chamber is preferably arranged on that side of the partition which is averted from the working chamber. Thus, the first throttle duct leads through the partition, wherein a section of the first throttle duct is formed by the space between the armature plunger and a radially inside wall of the bore through the partition. The working chamber and the first equalization chamber can thus be arranged so as to be sealed with respect to one another in a particularly effective manner. Furthermore, it has been discussed above that the valve may be formed by the control diaphragm and the partition. It is thus possible by way of the actuator for the control diaphragm to be moved, by way of its side facing toward the partition, such that the bore is closed off. In this case, the valve would also be closed. The formation of the partition with a bore and an armature plunger which leads through the bore and which is assigned to the armature of the actuator is therefore particularly compact, because multiple functions of the hydraulic mount can be ensured by identical components.

A preferred embodiment of the hydraulic mount is characterized in that the hydraulic mount comprises a second rolling diaphragm fastened to the partition, wherein the second equalization chamber is formed between the partition and the second rolling diaphragm. The second rolling diaphragm is preferably produced from elastic material. Moreover, it is preferable for the second rolling diaphragm to be of ring-shaped form. The second rolling diaphragm can thus be fastened by way of its radially inside edge and by way of its radially outside edge to the partition in positively locking, non-positively locking and/or cohesive fashion. The two edges are preferably spaced apart from one another. Moreover, provision is preferably made for the second rolling diaphragm to be arranged at that side of the partition which is averted from the working chamber. The second rolling diaphragm may furthermore extend radially at the outside with respect to the first rolling diaphragm. Different damping characteristics of a hydraulic mount can be structurally defined by way of the separate form of the first rolling diaphragm and of the second rolling diaphragm. For example, it is possible for a flow resistance of the first throttle duct to be greater than a flow resistance of the second throttle duct or vice versa. Correspondingly to the ratios of the flow resistances, it is possible for the damping characteristics to be set advantageously for particular vibration frequencies.

A preferred embodiment of the hydraulic mount is characterized in that the first and the second rolling diaphragm are configured separately or as an integral component. If the two rolling diaphragm are formed separately, these can also be fastened separately to the partition and to the armature plunger. This facilitates the assembly process. If the two rolling diaphragms are configured as an integral component, the two rolling diaphragms may have a common connection to the partition, such that this alternative embodiment also ensures simple assembly.

A preferred embodiment of the hydraulic mount is characterized in that a pressure chamber is provided, wherein the control diaphragm is arranged between the control duct and the pressure chamber. The pressure chamber may be filled with air, gas and/or a gas mixture. With the deflection of the control diaphragm, it is thus the case that not only the volume of the working chamber but also the volume of the pressure chamber is varied. Such a construction is basically known from the prior art and is also referred to as an inverted construction. This is because the pressure chamber may have a pressure which is higher than the nominal pressure in the working chamber. In the event of an actuation of the control diaphragm, it is thus the case that the forces acting on the hydraulic mount from the outside and the force of the armature act in opposite directions, such that regulation in the resonance range is possible. The pressure chamber may be arranged to a side of the partition facing toward the working chamber, such that the armature plunger likewise leads through a bore of the partition, and the abovementioned advantages can be realized.

According to a further aspect, the object mentioned in the introduction is also achieved by way of a motor vehicle which comprises a vehicle frame, an engine and an engine mount which produces a connection, with mounting action, between the engine and the vehicle frame, wherein the engine mount is formed by a hydraulic mount according to the invention. Here, features, details and advantages that have been described in conjunction with the hydraulic mount according to the invention self-evidently also apply in conjunction with the motor vehicle according to the invention and vice versa in each case, such that reference is always or can always be made reciprocally with respect to the disclosure of the individual aspects of the invention.

The invention will be described below, without restriction of the general concept of the invention, on the basis of exemplary embodiments and with reference to the drawings. In the drawings.

Figure 1:
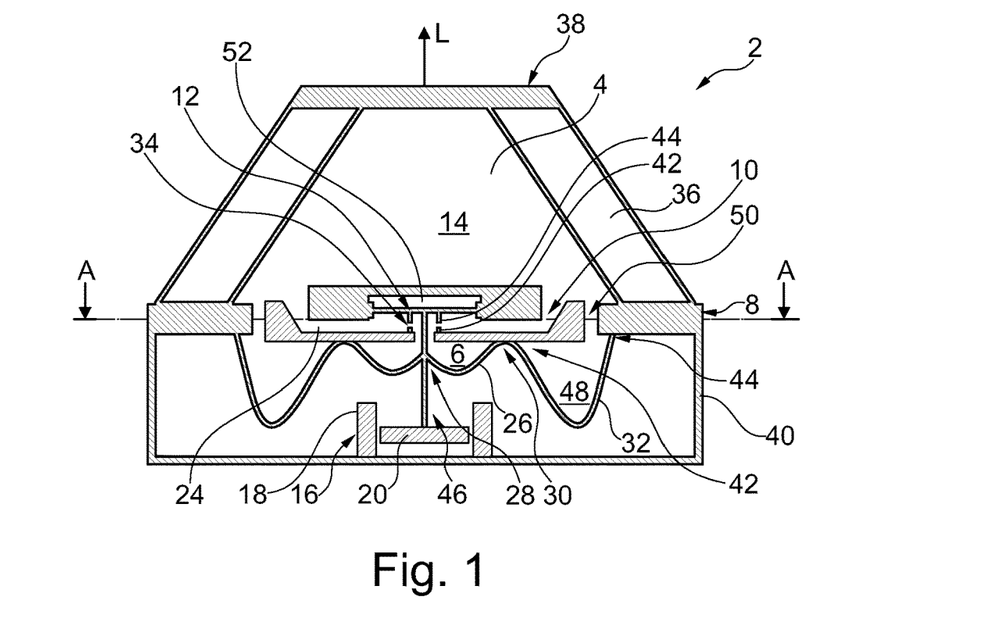
FIG. 1 shows a schematic cross-sectional view of the hydraulic mount.

FIG. 1 shows a hydraulic mount 2. The hydraulic mount 2 comprises a load-bearing spring 36 in the form of a rubber element. Said load-bearing spring 36 is, in the conventional manner, in the form of a hollow body, wherein the top side of the load-bearing spring 36 has a cover 38. A connection element (not illustrated) for the fastening of an engine is normally attached to the cover 38. In a simple embodiment, the connection element is a threaded bolt which can be screwed to the engine. The bottom side of the load-bearing spring 36 is adjoined by the partition 8. The working chamber 4 is formed between the load-bearing spring 36, the cover 38 and the partition 8. The working chamber 4 is filled with a hydraulic fluid. This is preferably a mixture of oil and water. Below the partition 8 in the longitudinal direction L, said partition is adjoined by the hollow cylindrical base housing 40. The first rolling diaphragm 26, which is produced from elastic material, is introduced into the base housing 40. Owing to its ring-shaped form, the first rolling diaphragm 26 is fastened by way of its radially inside edge 28 to the armature plunger 46 of the linear actuator 16 and by way of its radially outside edge 30 to the bottom side of the partition 8. The second rolling diaphragm 32, which is likewise produced from elastic material, is furthermore introduced into the base housing 40. The second rolling diaphragm also has a ring-shaped form. By way of its radially inside edge 42 and by way of its radially outside edge 44, the second rolling diaphragm 32 is fastened to the underside of the partition 8. The radially inside edge 42 of the second rolling diaphragm 32 and the radially outside edge 44 thereof have a radial spacing to one another.

The space enclosed by the partition 8, the first rolling diaphragm 26 and the armature plunger 46 forms the first equalization chamber 6 of the hydraulic mount 2. The space enclosed by the partition 8 and the second rolling diaphragm 32 forms the second equalization chamber 48. Each of the equalization chambers 6, 48 is preferably filled with hydraulic fluid, which is preferably a mixture of oil and water. It can thus be seen from FIG. 1 that the partition 8 is arranged between the working chamber 4 and the equalization chambers 6, 48.

For the damping of vibrations which are exerted by the engine on the load-bearing spring 36 via the cover 38 and which thus also act on a working chamber volume 14 of the working chamber 4, a first throttle duct 10 which is formed between the working chamber 4 and the first equalization chamber 6 and a second throttle duct 50 which is formed between the working chamber 4 and the second equalization chamber 6 are provided, which throttle ducts each serve for the exchange of hydraulic fluid. As illustrated in FIG. 1, the throttle ducts 10, 50 are at least partially formed by, or enclosed in, the partition 8.

If the load-bearing spring 36 is compressed as a result of vibrations, this normally leads to an increase of the pressure of the hydraulic fluid in the working chamber 4 and/or to a decrease in size of the working chamber volume 14 of the working chamber 4. In both cases, a volume flow of the hydraulic fluid takes place from the working chamber 4 through the second throttle duct 50 into the second equalization chamber 50. The throttle duct 50 has such a small diameter that dissipation occurs, and the vibrations acting on the load-bearing spring 36 are damped. The damping by way of the throttle duct 50 is however effective only for low-frequency vibrations. In the presence of relatively high-frequency vibrations, for example above 20 Hz, vibrations are only slightly damped or prevented by way of the throttle duct 50.

To even more effectively damp the low-frequency vibrations, use can be made of the first throttle duct 10, which connects the working chamber 4 to the first equalization chamber 6. Here, it is preferably provided that, for the damping of said vibrations, the valve 34 does not shut off the first throttle duct 10. Rather, the first throttle duct 10 is opened by the valve 34. If an increase of the pressure of the hydraulic fluid in the working chamber 4 now occurs, hydraulic fluid flows through both throttle ducts 10, 50 into the respectively associated equalization chambers 6, 48. A dissipation then occurs in the first throttle duct 10. By virtue of the fact that flow can pass through both throttle ducts 10, 15 in parallel, the hydraulic mount 2 can better damp low-frequency vibrations.

With the opened first throttle duct 10 and the first equalization chamber 6, however, the stiffness of the hydraulic mount 2 for static or quasi-static loads with a frequency of up to 5 Hz is also reduced. To increase the stiffness of the hydraulic mount 2 for such loads, it is provided according to the invention that the first throttle duct 10 can be shut off or throttled by way of the valve 34. The valve 34 thus serves for shutting off or throttling a throughflow of hydraulic fluid through the first throttle duct 10. If the hydraulic mount 2 is now subjected to a quasi-static load, the hydraulic fluid cannot, when the valve 34 is closed, flow into the first equalization chamber 6, such that a corresponding deformation or inflation of the load-bearing spring 36 occurs. The deformation or inflation of the load-bearing spring 36 gives rise to a desired damping action.

For the isolation of vibrations with a frequency of greater than 20 Hz, the hydraulic mount 2 has a control diaphragm 12 which is fluidically connected to the working chamber 4. For this purpose, a control duct 24 is provided for producing a hydraulic connection from the working chamber 4 to the control diaphragm 12. As can be seen from FIG. 1, the control diaphragm 12 is arranged between the control duct 24 and a pressure chamber 52. The hydraulic mount 2 is thus a mount with an inverted operating principle. The control duct 24 furthermore forms a section of the first throttle duct 10. The control duct 24 or said section of the first throttle duct 10 thus leads from the working chamber 4 to the control diaphragm 12. One end of the control duct 24 or of the first throttle duct 24 is open toward the working chamber 4. The other end of the control duct 24 is adjoined by the control diaphragm 12 and by the remaining section of the throttle duct 24. The valve 34 is arranged at the transition from that section of the throttle duct 10 which is formed by the control duct 24 to the remaining throttle duct 10. Here, the valve 34 is formed by a valve seat 42, which is formed by the partition 8, and by a valve disk 44, which is formed by the control diaphragm 12. The control diaphragm 12 and the partition 8 thus form a sealing surface and a corresponding counterpart sealing surface for the opening, closing or throttling of the throughflow of hydraulic fluid through the valve 34. The control diaphragm 12 and thus also the valve disk 44 are coupled by way of the armature plunger 46 to the armature 20 of the linear actuator 16. The linear actuator 16 is preferably an electromagnetic linear actuator. Other linear actuators are however also possible. If, in the case of an electromagnetic linear actuator, the stator 18 is energized, this leads to a relative movement of the armature 20, such that the control diaphragm 12 is deflected in the longitudinal direction L of the hydraulic mount 2. Here, the linear actuator 16 can move the control diaphragm 12 and thus also the valve disk 44 against the valve seat 42, such that the valve 34 is closed. In this case, the throttle duct 10 is shut off. To open the valve 34, the control diaphragm 12 is moved in the opposite direction by way of the linear actuator 16. Since the control diaphragm 12 is arranged between the control duct 24 and the pressure chamber 52, the valve 34 can assume an opened state, a closed state or any desired state in between, if the linear actuator 16 correspondingly deflects the control diaphragm 12. In the case of the electromagnetic linear actuator 16, this is realized by way of corresponding energization of the stator 18. Furthermore, it is assumed that the control diaphragm 12 is moved such that the valve 34 is opened, such that the control diaphragm 12 can perform a stroke movement in the longitudinal direction L of the hydraulic mount 2. Thus, the control diaphragm 12 communicates with the working chamber volume 14 of the working chamber 4. For vibrations of 20 Hz to approximately 200 Hz, the diameter of the control duct 24 is dimensioned such that at least substantially no dissipation occurs. Control diaphragm 12 is designed to be displaceable in the direction of its normal. In accordance with its displaceability, the working chamber volume 14 of the working chamber 4 increases or decreases in size. Said displaceability of the control diaphragm 12 is utilized advantageously to as far as possible isolate relatively high-frequency vibrations.

It has already been discussed above that the control duct 24 forms a first section of the first throttle duct 10. As can be seen from FIG. 1, the first section of the first throttle duct 10 and of the adjoining valve 34 is adjoined by a further section of the throttle duct 10, which is formed by the space between the partition 8 and the armature plunger 46. To realize a desired throttling action of the throttle duct 10, it is possible for the radial spacing between the partition 8 and the armature plunger 46 to be adapted, such that the desired dissipation and the corresponding damping are realized in the case of a throughflow of hydraulic fluid through the first throttle duct 10. A further possibility for the adaptation or increase of the dissipation is offered by the valve 34. This is because said valve can, owing to the pressure chamber 52, be moved by way of the linear actuator 16 into any desired state between the opening state and the shut-off state. It is thus possible for the throttling by way of the valve 34 to be controlled in a manner dependent on the frequency of the vibrations acting on the hydraulic mount 2.

Figure 2:
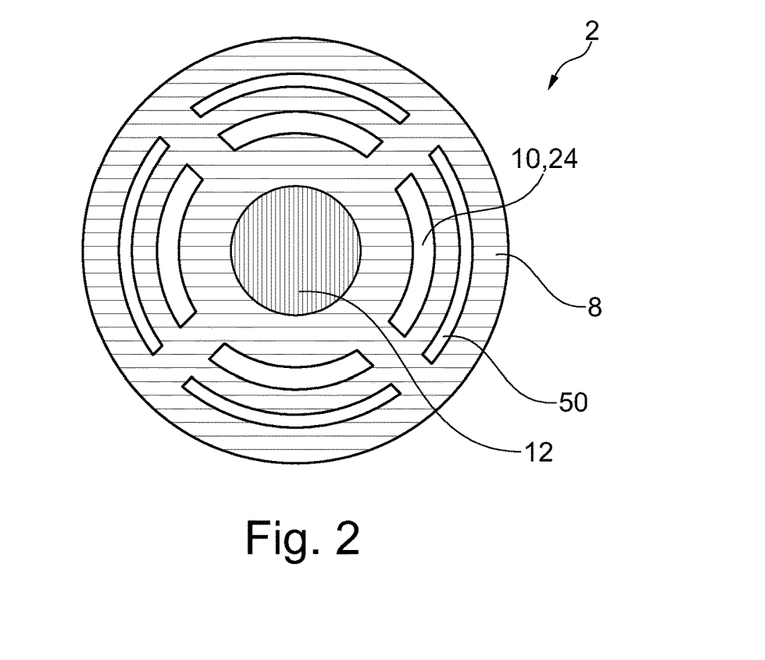
FIG. 2 shows a schematic view of the hydraulic mount along the section A-A.

FIG. 2 is a sectional illustration of the hydraulic mount 2 along the section A-A from FIG. 1. Here, the section runs substantially through the partition 8. The partition 8 is arranged between the working chamber 4 and the equalization chamber 6, 48. It is thus also possible to see the first throttle duct 10 or the control duct 24 and the second throttle duct 50 in FIG. 2. For this purpose, said ducts 6, 24, 50 may in each case be of multi-part form, such that each of the ducts 6, 24, 50 is formed by a multiplicity of sub-ducts. These may be arranged so as to be distributed over the circumference of the hydraulic mount. The control diaphragm 12 fits into the central region of the partition 8. The pressure chamber 52 illustrated in FIG. 1 thus forms between the control diaphragm 12 and the partition 8.

Figure 3:
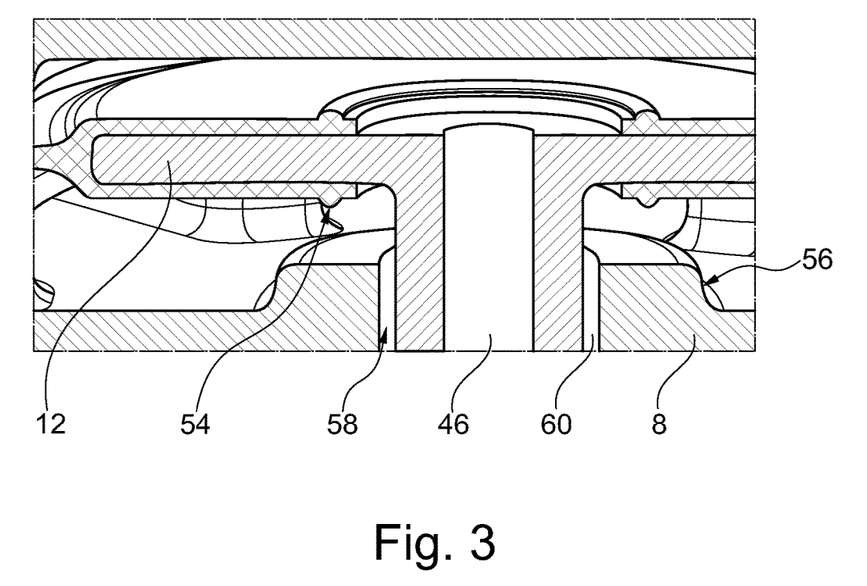
FIG. 3 shows a detail of a schematic, perspective sectional illustration of the control diaphragm and of the adjoining partition.

FIG. 3 shows a detail of a schematic, perspective sectional illustration of the control diaphragm 12 and of the adjoining partition 8. The control diaphragm 12 has, on the side facing toward the partition 8, a sealing contour 54 which forms a sealing surface of the valve 34. The partition 8, on a side facing toward the control diaphragm 12, likewise has a sealing contour 56 which forms a counterpart sealing surface of the valve 34. The valve 34 is thus formed by the control diaphragm 12 and by the partition 8. If the control diaphragm 12 is moved against the partition 8 by way of the armature plunger 46 of the actuator 16, the sealing surface of the sealing contour 54 abuts against the sealing surface of the sealing contour 56, such that the valve 34 closes off the first throttle duct 10. That section of the first throttle duct 10 which forms between the armature plunger 46 and a radially inside wall 58 of a bore 60, through which the armature plunger 46 leads, of the partition 8 is thus decoupled from the working chamber 4. Possible pressure fluctuations in the working chamber 4 then do not lead to an exchange of hydraulic fluid between the working chamber 4 and the first equalization chamber 6.

LIST OF REFERENCE SIGNS

Part of the Description
L Longitudinal direction
2 Hydraulic mount
4 Working chamber
6 First equalization chamber
8 Partition
10 First throttle duct
12 Control diaphragm
14 Working chamber volume
16 Linear actuator
18 Stator
20 Armature
24 Control duct
26 First rolling diaphragm
28 Radially inside edge
30 Radially outside edge
32 Second rolling diaphragm
34 Valve
36 Load-bearing spring
38 Cover
40 Base housing
42 Valve seat
44 Valve disk
46 Armature plunger
48 Second equalization chamber
50 Second throttle duct
52 Pressure chamber
54 Sealing contour
56 Sealing contour
58 Wall
60 Bore

The invention claimed is:

1. A hydraulic mount comprising:
   a load-bearing spring;
   a working chamber at least partially surrounded by the load-bearing spring, wherein the working chamber is filled with a hydraulic fluid;
   a first equalization chamber;
   a first throttle duct formed between the working chamber and the first equalization chamber, wherein the first throttle duct serves for exchange of hydraulic fluid;
   a control diaphragm which is designed for the variation of a working chamber volume of the working chamber;
   an actuator for the deflection of the control diaphragm; and,
   a controllable valve for shutting off or throttling a throughflow of hydraulic fluid through the first throttle duct, wherein the controllable valve is controllable by way of the actuator;
   wherein the controllable valve is formed by the control diaphragm and the partition; and,
   wherein the hydraulic mount further comprises a second equalization chamber, and a second throttle duct formed between the working chamber and the second equalization chamber, wherein the second throttle duct serves for exchange of hydraulic fluid.

2. The hydraulic mount as claimed in claim 1 further comprising a partition arranged between the working chamber and the second equalization chamber, wherein the second throttle duct is formed by a partition.

3. The hydraulic mount as claimed in claim 1, wherein the hydraulic mount comprises a control duct which leads from the working chamber to the control diaphragm.

4. The hydraulic mount as claimed in claim 3, wherein the control duct forms a section of the first throttle duct.

5. The hydraulic mount as claimed in claim 2, wherein the partition forms a sealing surface of the controllable valve and the control diaphragm forms a counterpart sealing surface of the controllable valve, and wherein a space between the sealing surface and the counterpart sealing surface forms a section of the first throttle duct.

6. The hydraulic mount as claimed in claim 5, wherein the partition comprises, on a side facing toward the control diaphragm, a sealing contour which forms the sealing surface, and the control diaphragm comprises, on a side facing toward the partition, a further sealing contour which forms the counterpart sealing surface.

7. The hydraulic mount as claimed in claim 3 further comprising a pressure chamber, wherein the control diaphragm is arranged between the control duct and the pressure chamber.

8. A hydraulic mount comprising:
a load-bearing spring;
a working chamber at least partially surrounded by the load-bearing spring, wherein the working chamber is filled with a hydraulic fluid;
a first equalization chamber;
a first throttle duct formed between the working chamber and the first equalization chamber, and wherein the first throttle duct serves for exchange of hydraulic fluid;
a controllable valve for shutting off or throttling a throughflow of hydraulic fluid through the first throttle duct;
an actuator for the deflection of the control diaphragm, wherein the actuator comprises a stator and an armature which is movable in a longitudinal direction of the stator, wherein the armature is assigned an armature plunger, wherein the armature is mechanically connected by way of the armature plunger to the control diaphragm; and,
a first rolling diaphragm fastened to the armature plunger and to a partition, wherein the first equalization chamber is formed between the partition, the armature plunger and the first rolling diaphragm;
wherein the hydraulic mount comprises a control duct which leads from the working chamber to the control diaphragm; and,
wherein the hydraulic mount comprises a second rolling diaphragm fastened to the partition, and wherein the second equalization chamber is formed between the partition and the second rolling diaphragm.

9. The hydraulic mount as claimed in claim 8, wherein the partition comprises a bore through which the armature plunger extends, and wherein a space between the armature plunger and a radially inside wall of the bore forms a section of the first throttle duct.

10. The hydraulic mount as claimed in claim 8, wherein the first and the second rolling diaphragm are configured separately, or as an integral component.

11. The hydraulic mount as claimed in claim 8, wherein the first and the second rolling diaphragm are configured as an integral component.

12. The hydraulic mount as claimed in claim 8 further comprising a pressure chamber, wherein the control diaphragm is arranged between the control duct and the pressure chamber.

13. The hydraulic mount as claimed in claim 8 further comprising a second equalization chamber, and a second throttle duct formed between the working chamber and the second equalization chamber, wherein the second throttle duct serves for exchange of hydraulic fluid.

14. The hydraulic mount as claimed in claim 13 further comprising a partition arranged between the working chamber and the second equalization chamber, wherein the second throttle duct is formed by a partition.

15. The hydraulic mount as claimed in claim 8 wherein the controllable valve is formed by the control diaphragm and the partition.

16. A motor vehicle comprising:
a vehicle frame,
an engine and
an engine mount which produces a connection, with mounting action, between the engine and the vehicle frame,
wherein the engine mount comprises a load-bearing spring, a working chamber at least partially surrounded by the load-bearing spring, a first equalization chamber, a first throttle duct formed between the working chamber and the first equalization chamber, a control diaphragm which is designed for the variation of a working chamber volume of the working chamber, an actuator for the deflection of the control diaphragm, and a controllable valve for shutting off or throttling a throughflow of hydraulic fluid through the first throttle duct;
wherein the controllable valve is controllable by way of the actuator, wherein the working chamber is filled with a hydraulic fluid, and wherein the first throttle duct serves for exchange of hydraulic fluid;
wherein the controllable valve is formed by the control diaphragm and the partition; and,
wherein the engine mount further comprises a second equalization chamber, and a second throttle duct formed between the working chamber and the second equalization chamber, wherein the second throttle duct serves for exchange of hydraulic fluid.

* * * * *